Feb. 26, 1952
W. O. VEDDER
2,587,417
RADIAL FLOW WET DUST COLLECTOR
Filed Jan. 10, 1950
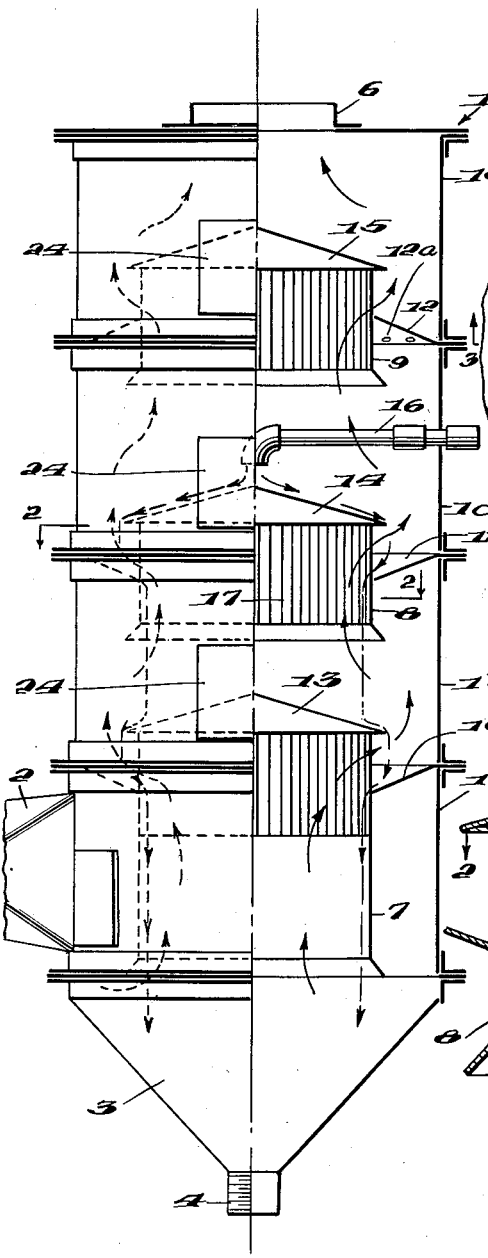
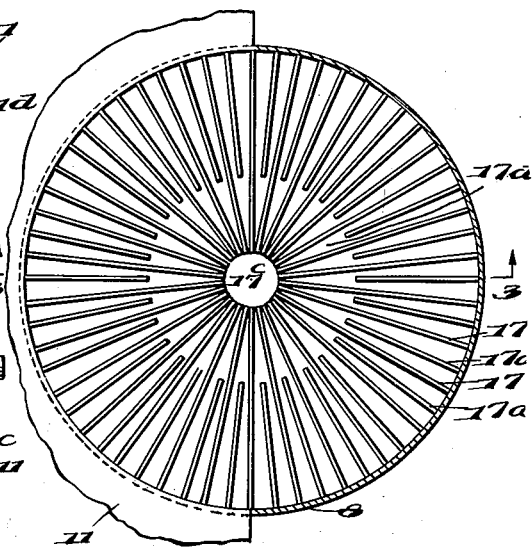
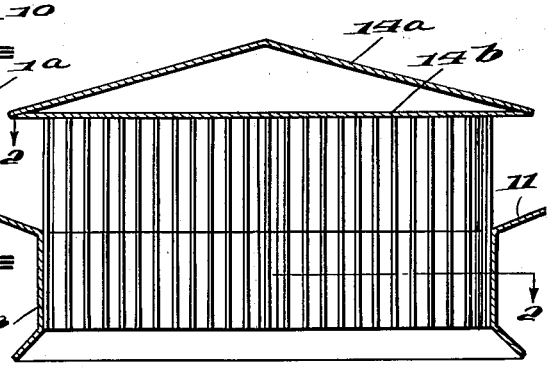
INVENTOR.
WALTER O. VEDDER,
BY
*Hall & Houghton*
ATTORNEYS Patented Feb. 26, 1952

2,587,417

UNITED STATES PATENT OFFICE 2,587,417

RADIAL FLOW WET DUST COLLECTOR

Walter O. Vedder, Hagerstown, Md., assignor to Pangborn Corporation, Hagerstown, Md., a corporation of Maryland Application January 10, 1950, Serial No. 137,775

1 Claim. (Cl. 183—21)

This invention relates to dust collectors and aims to provide a wet dust collector of high efficiency and simple and compact construction.

Among the objects of the invention, severally and interdependently, are the following: To provide in such a collector novel means for impinging relatively narrow air streams on greatly extended areas of wetted surface. To provide therein novel means for causing a sharp change in direction and impingement on wetted surfaces of the gas stream to be cleaned. To provide therein effective means for adjusting the impact velocity of laden gases against wetted surfaces. To provide therein means to increase the impact velocity in successive wet separating stages to increase the effectiveness of the separation on the finer dust particles. To provide a structure for obtaining a high degree of wetted surface impingement together with change in direction of relatively narrow air streams with a minimum of resistance to air flow. To provide an efficient wet separator having low-resistance linear airflow. To provide a wet separator having low-resistance linear airflow through a plurality of wetting sections and through a liquid eliminating section.

Further objects and advantages of the invention will be apparent from the following description of an exemplary embodiment thereof.

The invention comprises the novel features and combinations hereinafter described and claimed.

In the accompanying drawings:

Fig. 1 is a vertical elevation partly in section of one embodiment of the invention.

Fig. 2 is a compound horizontal cross section taken on the line 2—2 of Figs. 1 and 3 looking in the direction indicated by the arrows.

Fig. 3 is an enlarged vertical section partly in elevation taken on the line 3—3 of Fig. 2 looking in the direction of the arrows.

In the embodiment of the invention shown in the drawings the apparatus comprises a vertical casing or column 1 made up of several sections or stages 1a, 1b, 1c, 1d respectively. The section 1a, as best shown in Fig. 2, is preferably provided with a tangential gas inlet 2 and a hopper bottom 3 having a sludge outlet 4. As set forth in my co-pending application Ser. No. 75,227, this section may be provided with a water inlet or spray nozzle (not shown) aligned with the tangential gas inlet for spraying liquid into the entering gas and onto the walls of the section 1a if this is desired.

The final section 1d in the form shown is provided centrally of its top wall with a gas outlet 6 which may lead to a suction fan if desired.

The several sections or compartments 1b, 1c and 1d are each provided with uptake ducts 7, 8, 9 and with partition means 10, 11, 12 closing the space between the associated uptake duct and the casings 1.

As shown each of the uptake ducts 7, 8, 9 is preferably provided with a flared or skirted lower entrance portion aiding in smoothly conducting thereinto the entering gas stream.

Each of the sections 1b, 1c, 1d is further provided with a cap 13, 14, 15 overlying its associated duct 7, 8, 9 and spaced therefrom and from the overlying duct 8, 9 and 6. As shown each cap 13, 14, 15 preferably has a conical top wall and a flat lower wall as exemplified at 14a and 14b in Fig. 3, and the caps as there shown are preferably somewhat larger than the underlying ducts to overhang the same, as shown.

In the intermediate or wet vane sections 1b, 1c the bottoms 10, 11 are dished or sloped to conduct liquid falling thereon inwardly to the ducts 7, 8 to be sub-divided and spread across the surfaces therein as hereinafter more fully described. The uppermost of the intermediate or wet vane sections 1c is provided with a liquid inlet pipe 16 which in the form shown discharges centrally above the cap or baffle 14.

In the eliminator section 1d the partition means 12 (Fig. 2) is preferably of inverted dished form, or sloped away from the uptake duct 9, and when so formed may be provided adjacent the casing wall 1d with perforations 12a (Fig. 1) or other means for delivering water collected in the eliminator section to the underlying wet vane section 1c.

Each of the sections 1b, 1c, 1d in the form shown is provided with vane means 17—17a extending laterally under its associated cap 13, 14, 15, and extending longitudinally within the associated uptake duct 7, 8, 9. The vane means 17—17a, as best shown in Figs. 2 and 3, comprises rectifying vanes extending longitudinally for a substantial distance within the uptake duct and dividing or splitting the upflowing gases into a multiplicity of narrow streams confined between the wetted walls of the vanes and directed vertically toward the underlying surface of the associated cap 13, 14, 15. In the space between the cap and the top of the associated uptake tube 7, 8, 9, the vane means provides laterally directed outlets. Thus the sub-divided narrow streams of gas pass upwardly in close contact with the wetted vanes and are forced to change direction under the associated cap and pass laterally outwardly under the perimetral edges of the cap. The water or other liquid supplied through the inlet pipe 16 cascades sheetwise around the perimetral edges of the caps 14 and 13 forming a water screen, curtain or sheet, through which the gases discharged from each vane section pass in their lateral flow toward the surrounding casing wall 1. The airflow carries with it portions of the descending water thoroughly wetting all the internal walls of the collector including the wall surfaces of the multiplicity of passages provided by the wet vane means 17—17a. The water flowing inwardly over the dished bottoms 10, 11 of the wet vane sections passes into the uptake ducts 7, 8 and down the wall portions thereof, and flows downwardly as a generally perimetral sheet or screen from the lower end of the uptake duct, as indicated by the feathered arrows in Fig. 1. Thus the air entering these uptake ducts has to pass through this water screen on its way to the vane section and picks up therefrom water which is carried back to and distributed over the vane section.

In the forms of the above mentioned co-pending application the vane sections throughout their heights are perimetrically equal in extent to the associated uptake ducts 7, 8, 9, as they are in the present case. In those forms, however, the vanes are arranged to discharge the narrow streams of air in groups of sheets, the sheets within each group being directed in generally parallel direction, and the air of the groups expanding laterally and upwardly in the regions between groups. In the present arrangement, the vanes 17—17a extending radially about the axis of the ducts 7, 8, 9, as best shown in Fig. 2, in which the vanes 17 are shown extending from the perimeter nearly to the center of the duct, while the vanes 17a extend from the perimeter a less distance toward the center.

With this arrangement the spaces between the vanes increase in volumetric capacity as the perimeter is approached. The central core of air in the axial space 17c expands laterally through the narrow slits between the vane ends and aids in accelerating the air flow outwardly under the cap plate 14b. The air in the space 17d does likewise through the relatively narrow openings adjacent the inner edges of the vanes 17a. The spaces between the vanes 17—17a likewise flare outwardly, thus promoting maximum uniformity in the distribution of the air flowing radially outwardly from the lateral discharge openings of the vane assembly. As a result the sheets of liquid descending from the caps in chambers 1b and 1c are most uniformly contacted with the outflowing air, this air impinges nearly radially against the wet outer walls 1b, 1c, and its change of direction is nearly all a smooth upward and inward turning in vertical planes, with practically no peripheral rotation and a minimum of power consuming turbulence in each stage.

The caps 13, 14 and 15 and their associated vane assemblies 17—17a are preferably vertically adjustable within their associated upflow ducts 7, 8, and 9, such adjustments being afforded in any suitable way.

Exemplary modes of affecting such adjustment have heretofore been disclosed by me in my copending application above mentioned, to which reference may be had, if desired, but are not set forth herein as the present invention is not limited to any particular way of affecting the contemplated adjustment.

By virtue of their adjustability the vane sections may be raised or lowered to decrease or increase the impact velocity against the internal wetted surfaces of the casing 1. By virtue of this feature it is also possible to adjustably increase the impact velocity in successive wet sections to increase the effectiveness of impact on the finer dust particles carried through to the upper wet vane sections. To suit specific requirements the spacing between the vanes of the vane sections 17 may also be increased or decreased.

Any or all of the compartments 1a, 1b, 1c, 1d may be provided with one or more windows 24 to enable observation of the operation of the device in various conditions of adjustment.

It will be seen that in the operation of this form of the invention the dust-laden air or gas entering the inlet tube is subjected to preliminary wetting and preliminary separation of the larger dust particles before entering the first uptake tube 7. When the preliminary separation is accomplished centrifugally as in the form shown, the air entering the uptake tube 7 is in whirling motion. The rectifying vanes 17—17a associated with the tube 7 eliminate the whirling motion and cause the air to pass vertically upward for the most part in narrow wedge shaped streams in contact with the wet vane surfaces. The air impinging on the underside of the cap 13 is forced to undergo a change in direction thus throwing out moisture and dust content against the cap 13 to descend by gravity along the vanes 17. The air discharging perimetrally under the edges of cap 13 is channelled nozzlewise and expanded radially and thoroughly rewetted by the water cascading over the edges of this cap and is projected forcefully against the casing wall 1b. This impingement and the ensuing change in direction of the air causes more dust and water to be deposited on the wall 1b. The air then passes through the descending rain of water falling from the uptake tube 8 and is thoroughly rewetted as it enters this second wet vane section for further impingement cleaning. After passing through the desired number of wet vane sections, two of which are shown, the well-washed air, with such residual moisture as is entrained therein, passes into the uptake duct 9 where its change in direction under the cap 15 deposits much of its moisture, and then passes radially into the discharge section 1d. Here the impact with the wall 1d delivers the air of virtually all of the entrained water droplets and the cleaned air unladen of its entrained water is delivered through the outlet 6. The water deposited in the dewatering section 1d, is conducted to the underlying section 1c without passing through the duct 9, so relatively little rain occurs at the entrance to this duct.

As a general rule the several vane sections of a given installation may be similar in construction although it is contemplated that the different stages may be provided with different specific forms of vane means best suited to the separation to be effected at the given stage as will be apparent from the various forms exemplified herein and in my co-pending application. Furthermore while I prefer to supply liquid through the inlet 16 and employ a maximum of countercurrent flow of liquid and air, the invention may be adapted for parallel flow in which the water is admitted to the entering air stream and carried thereby through the several stages. Any desired number of wet stages and eliminator sections may be employed, and in the broader aspects of the invention any desired form of preliminary wetting and separating means may be used.

Due to the subdividing and multiple impingement operation in dust separators according to the present invention, highly effective separation is obtained with relatively low fan power and consumption of relatively small quantities of water. The particles of material carried by the air stream are recovered at one liquid draw-off point, namely, the sludge outlet 4, Fig. 1, which may be piped directly to the sewer or other place of disposal.

From the foregoing description it will be apparent that the specific embodiments disclosed herein are illustrative and not restrictive of the invention, the scope of the invention being defined in the appended claim. All modifications which come within the meaning and range of equivalency of the claim are therefore intended to be included therein.

I claim as my invention:

In a wet dust collector having vanes for mechanically trapping particles from suspended condition in a gas contacting the vanes, a vane assembly comprising: a retaining duct portion, a multiplicity of thin, flat plates directed toward each other radially inwardly from said duct portion to form between adjacent vanes a multiplicity of radially extending passageways which expand in the outward direction, said plates being of two different kinds each having different radial dimensions and arranged alternately so that the smaller plates divide only the outer portions of the individual passageways formed by the larger plates, said plates projecting out of said duct; and a cap covering the projecting plates to form a deflecting wall for the radially extending passageways.

WALTER O. VEDDER.

REFERENCES CITED

The following references are of record in the file of this patent:

UNITED STATES PATENTS

| Number | Name | Date |
| --- | --- | --- |
| 1,087,970 | Murray | Feb. 24, 1914 |
| 1,128,177 | Moser | Feb. 9, 1915 |
| 1,264,263 | Brassert | Apr. 30, 1918 |
| 1,783,813 | Schneible | Dec. 2, 1930 |
| 1,894,744 | Hawley | Jan. 17, 1933 |
| 2,141,829 | Schneible | Dec. 27, 1938 |
| 2,259,034 | Fisher | Oct. 14, 1941 |
| 2,354,674 | Fisher | Aug. 1, 1944 |
| 2,409,088 | Weits et al. | Oct. 8, 1946 |